United States Patent
Magoto (10) Patent No.: US 8,651,797 B2
(45) Date of Patent: Feb. 18, 2014

(54) BACKREST ASSEMBLY FOR A MATERIALS HANDLING VEHICLE

(75) Inventor: Daniel C. Magoto, Russia, OH (US)

(73) Assignee: Crown Equipment Corporation, New Bremen, OH (US)

( * ) Notice: Subject to any disclaimer, the term of this patent is extended or adjusted under 35 U.S.C. 154(b) by 375 days.

(21) Appl. No.: 12/890,977

(22) Filed: Sep. 27, 2010

(65) Prior Publication Data

US 2012/0076624 A1    Mar. 29, 2012

(51) Int. Cl.
*B62B 3/06*    (2006.01)

(52) U.S. Cl.
USPC .......................................................... 414/785

(58) Field of Classification Search
CPC .......................................................... B62B 3/06
USPC .................. 187/237; 414/495, 661, 667, 785
See application file for complete search history.

(56) References Cited

U.S. PATENT DOCUMENTS

| | | | |
|---|---|---|---|
| 2,590,355 A | 3/1952 | Turner et al. | |
| 2,619,241 A | 11/1952 | Jessen | |
| 2,633,260 A * | 3/1953 | Sutherland | 414/785 |
| 2,993,610 A | 7/1961 | Kughler | |
| 3,182,836 A | 5/1965 | Sinclair | |
| 3,548,573 A * | 12/1970 | Krehbiel | 56/208 |
| 3,625,385 A * | 12/1971 | Ide | 414/785 |
| 4,043,472 A | 8/1977 | Hoyt | |
| 4,239,446 A | 12/1980 | Vucinic | |
| 4,266,106 A | 5/1981 | Fraser et al. | |
| 4,290,729 A | 9/1981 | Cary | |
| 4,403,903 A | 9/1983 | Cary | |
| 4,752,179 A | 6/1988 | Seaberg | |
| 4,808,060 A | 2/1989 | Wasylyshyn | |
| 4,824,317 A | 4/1989 | Schroder | |
| 4,828,450 A | 5/1989 | Adamski et al. | |
| 4,904,147 A | 2/1990 | Wasylyshyn | |
| 5,478,196 A | 12/1995 | Avitan et al. | |
| 5,752,584 A | 5/1998 | Magoto et al. | |
| 2004/0156700 A1 | 8/2004 | Chopra | |
| 2004/0265108 A1 | 12/2004 | Richardson | |
| 2008/0044270 A1 | 2/2008 | Mead | |

FOREIGN PATENT DOCUMENTS

| | | |
|---|---|---|
| DE | 4408293 A1 | 9/1995 |
| GB | 667585 A | 3/1952 |
| JP | 10316380 A | 12/1998 |

OTHER PUBLICATIONS

Crown; PTH 50 Series; 2007.
Crown; WP 2300 Series; Walkie Pallet Truck; 2009.

(Continued)

*Primary Examiner* — Saul Rodriguez
*Assistant Examiner* — Brendan Tighe
(74) *Attorney, Agent, or Firm* — Stevens & Showalter LLP (57) ABSTRACT

An adjustable backrest assembly for a materials handling vehicle. The backrest assembly includes an adjustable backrest structure and mounting structure for mounting the adjustable backrest structure on the materials handling vehicle so that the adjustable backrest structure extends generally vertically over load handling apparatus of the materials handling vehicle. The mounting structure enables pivoting movement of the adjustable backrest structure from a first position generally adjacent a power unit of the materials handling vehicle wherein pallets of a first size are accommodated to at least a second position spaced along the load handling apparatus from the power unit wherein pallets of a second size are accommodated.

22 Claims, 7 Drawing Sheets

(56) References Cited

OTHER PUBLICATIONS

Wochinz, Reinmar; International Search Report and Written Opinion of the International Searching Authority; International Application No. PCT/US2011/053251; Jan. 19, 2012; European Patent Office.

Yukari Nakamura; International Preliminary Report on Patentability; International Application No. PCT/US2011/053251; Apr. 11, 2013; The International Bureau of WIPO; Switzerland.

* cited by examiner

BACKREST ASSEMBLY FOR A MATERIALS HANDLING VEHICLE

FIELD OF THE INVENTION

The present invention relates to a materials handling vehicle comprising an adjustable backrest assembly for securely accommodating pallets having different lengths.

BACKGROUND OF THE INVENTION

It is known in the prior art to provide backrest assemblies in materials handling vehicles, wherein the backrest assembly provides a stop structure for goods carried by a load handling apparatus of the vehicle. For example, U.S. Pat. No. 6,595,306 discloses a fork load backrest provided on a pallet truck.

It is advantageous if the effective length of the load handling apparatus generally corresponds to the length of a pallet containing the goods being carried by the truck. Hence, adjustable backrest assemblies for materials handling vehicles have been developed, wherein the effective length of the load handling apparatus can be changed by adjusting the position of the backrest structure.

BRIEF SUMMARY OF THE INVENTION

The present invention relates to an adjustable backrest assembly for a materials handling vehicle that can be efficiently repositioned so as to accommodate pallets of varying sizes.

In accordance with a first aspect of the present invention, an adjustable backrest assembly is provided for a materials handling vehicle. The backrest assembly comprises an adjustable backrest structure and mounting structure for mounting the adjustable backrest structure on the materials handling vehicle so that the adjustable backrest structure extends generally vertically over load handling apparatus of the materials handling vehicle. The mounting structure enables pivoting movement of the adjustable backrest structure from a first position generally adjacent a power unit of the materials handling vehicle wherein pallets of a first size are accommodated, to at least a second position spaced along the load handling apparatus from the power unit wherein pallets of a second size are accommodated.

In accordance with a second aspect of the present invention, a materials handling vehicle comprises a power unit, a load handling apparatus, and a backrest assembly. The backrest assembly comprises an adjustable backrest structure and mounting structure for mounting the adjustable backrest structure to the materials handling vehicle so that the adjustable backrest structure extends generally vertically over the load handling apparatus of the materials handling vehicle. The mounting structure enables pivoting movement of the adjustable backrest structure from a first position generally adjacent the power unit wherein pallets of a first size are accommodated to at least a second position spaced along the load handling apparatus from the power unit wherein pallets of a second size are accommodated.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1A:
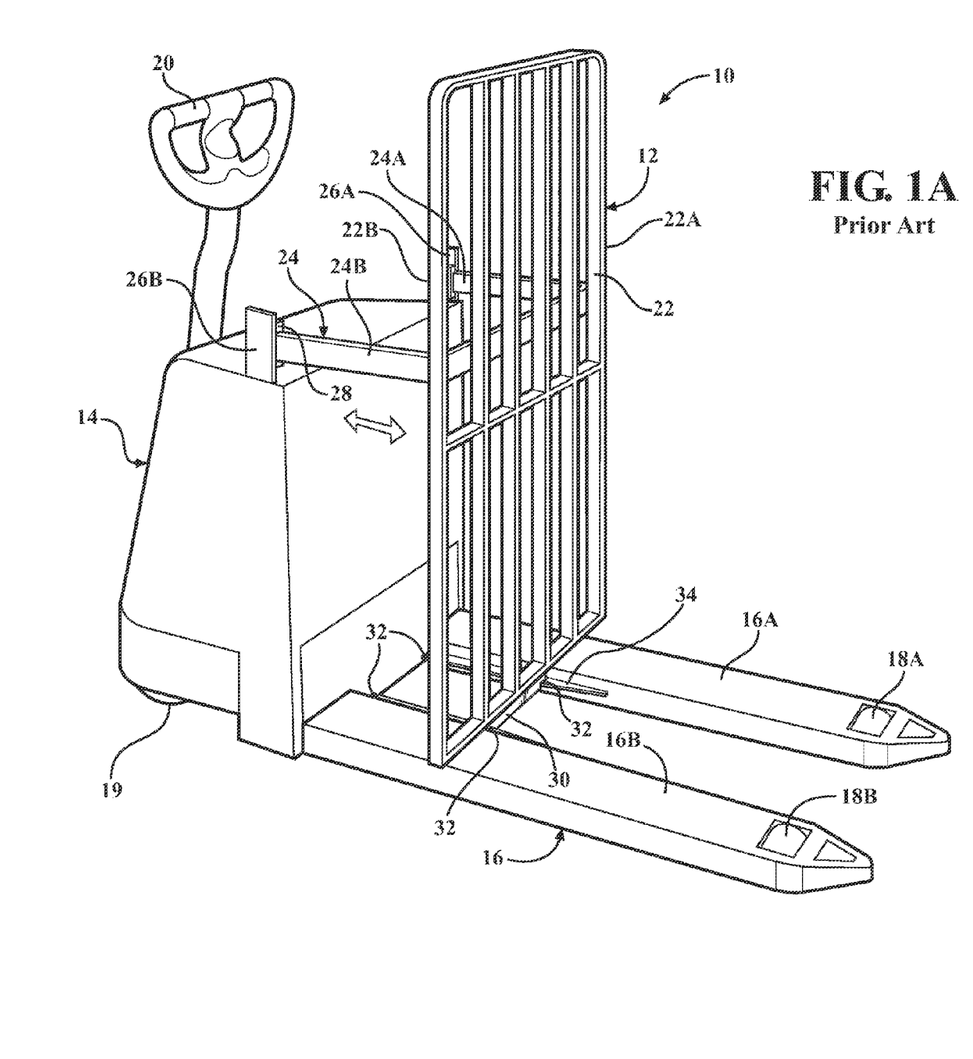
FIGS. 1A and 1B are perspective views of a materials handling vehicle having a backrest assembly according to the prior art.
Figure 1B:
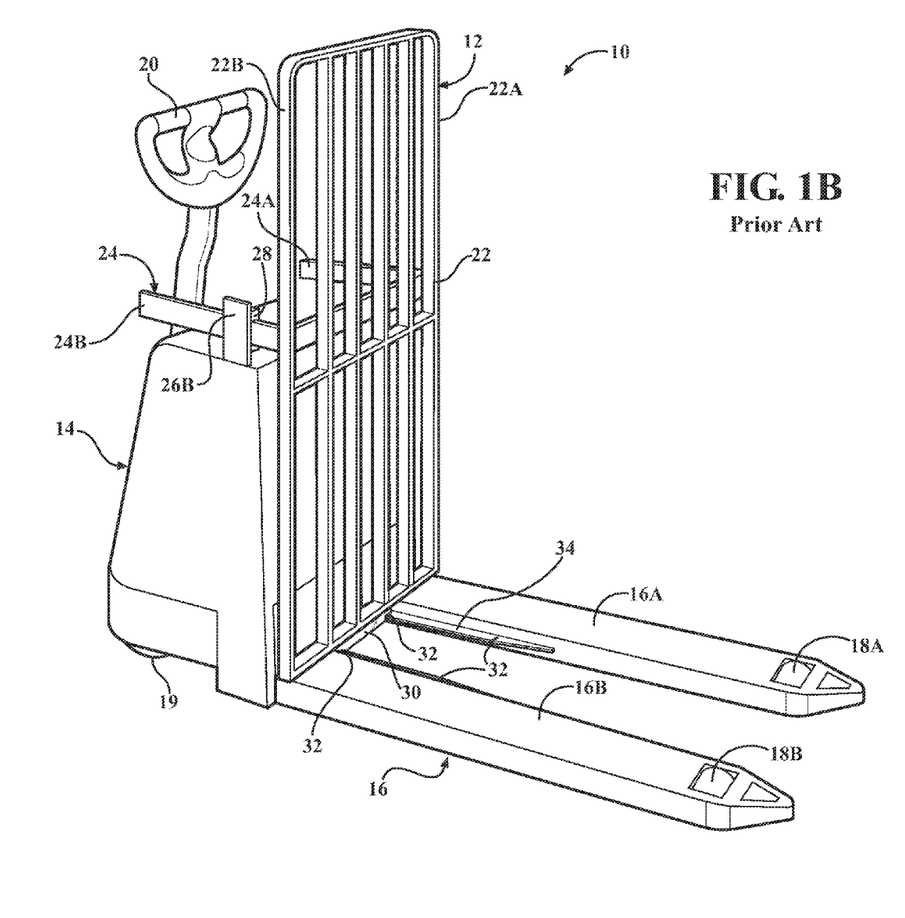

FIGS. 1A and 1B illustrate a materials handling vehicle 10 including an adjustable backrest assembly 12 according to the prior art. The materials handling vehicle 10 includes a power unit 14, a load handling apparatus 16 comprising a pair of forks 16A and 16B, each fork comprising a respective load wheel 18A, 18B, a pair of caster wheels 19 (only one shown), and a control handle 20. The vehicle 10 further comprises a steered driven wheel (not shown) that is powered by the power unit 14 and steered by rotation of the control handle 20.

The backrest assembly 12 comprises a generally vertically extending adjustable backrest structure 22 and coupling structure 24 mounted to the backrest structure 22. The coupling structure 24 comprises a pair of generally horizontally extending members 24A, 24B affixed to respective lateral sides 22A, 22B of the backrest structure 22. Each member 24A, 24B is slidably engaged with a corresponding support structure 26A, 26B affixed to the power unit 14 so as to allow the coupling structure 24, and, hence, the backrest structure 22, to move between a first position, illustrated in FIG. 1A, and a second position, illustrated in FIG. 1B. A locking mechanism 28, such as a clamping member, associated with the coupling structure 24 and the support structure 26 permits the backrest assembly 12 to be locked in the first and second positions.

The backrest assembly 12 also comprises a plate 30 that extends downwardly from the backrest structure 22 between the forks 16A, 16B. The plate 30 is received in corresponding notches 32 formed in metal strips 34 affixed to the respective forks 16A, 16B to secure the bottom portion of the backrest structure 22 in place.

Movement of the backrest assembly 12 is accomplished by an operator unlocking the locking mechanism 28, which allows the members 24A, 24B of the coupling structure 24 to slide relative to the support structures 26A, 26B. The backrest structure 22 is then lifted upwards so as to lift the plate 30 out of the notches 32 in the metal strips 34. The operator then slides the coupling structure 24 to move the backrest structure 22 to a desired position, such as the first position, the second position, or an intermediate position between the first and second positions. The backrest structure 22 is then lowered such that the plate 30 is inserted into the notches 32 in the metal strips 34 that correspond to the desired position. The operator may then use the locking mechanism 28 to lock the coupling structure 24, and, hence, the backrest structure 22, in the desired position.

In a typical day, operators may be required to transport hundreds of pallets. Such pallets may comprise different lengths, such that the operator may be required to frequently move the backrest structure 22 between the various positions, as it is desirable that the effective length of the forks 16A and 16B generally corresponds to the length of the pallet, as noted above. Movement of the backrest structure 22 in the prior art embodiment of FIGS. 1A and 1B between the various positions has been found to be difficult and time consuming. For example, movement of the backrest structure 22 between the first and second positions typically requires the use of both hands, and the coupling structure 24 is prone to getting stuck while moving positions due to the weight of the adjustable backrest structure 22 and the sliding engagement between the members 24A, 24B of the coupling structure 24 and the support structures 26A, 26B. Accordingly, an alternate type of backrest assembly is desired.

Figure 2:
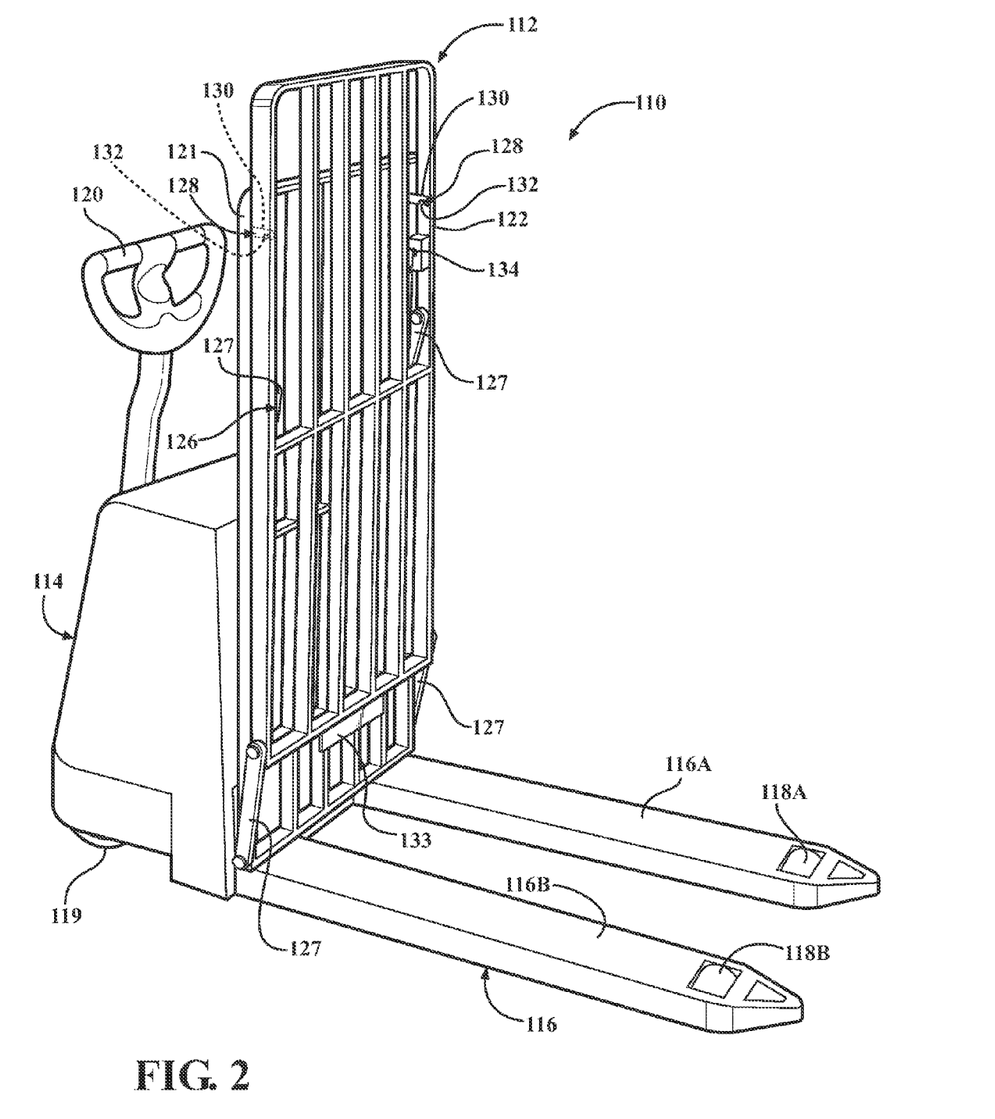
FIG. 2 is a perspective view of a materials handling vehicle having an adjustable backrest assembly according to an aspect of the present invention, wherein the backrest assembly is positioned in a first position.
Figure 3:
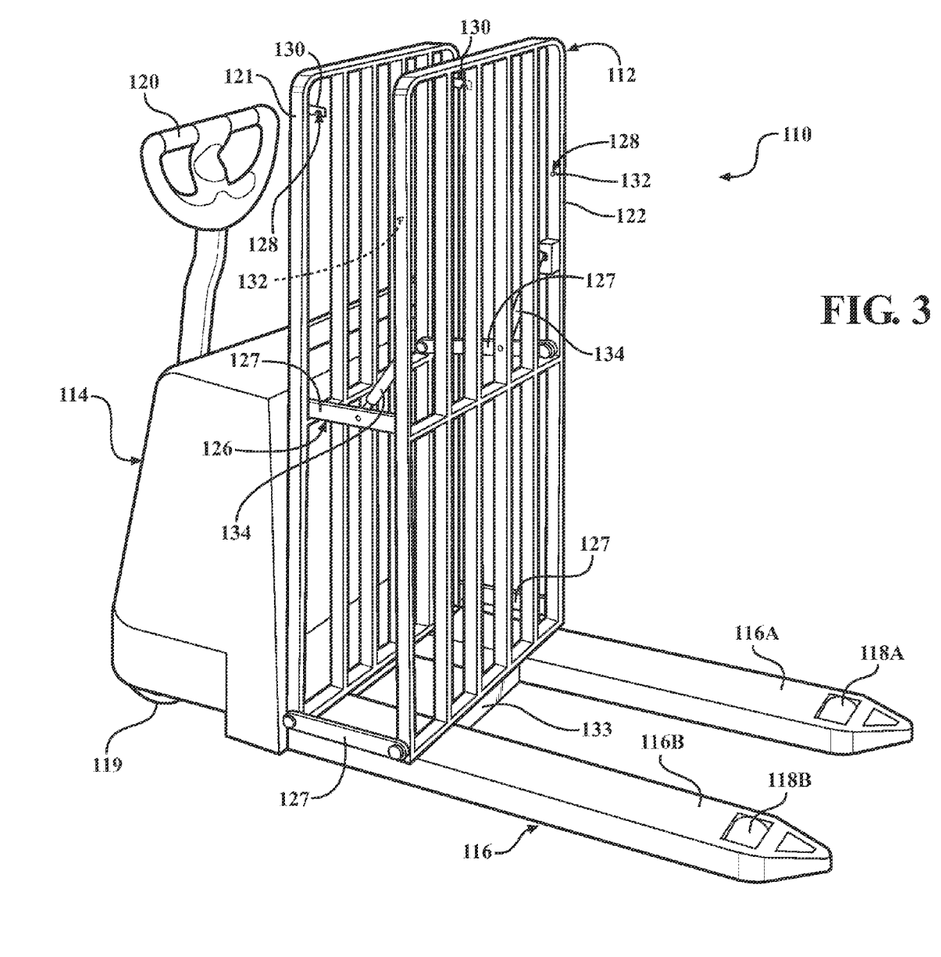
FIG. 3 is a perspective view of the materials handling vehicle illustrated in FIG. 2, wherein the backrest assembly is positioned in a second position.

Referring now to FIGS. 2 and 3, a materials handling vehicle 110 including an adjustable backrest assembly 112 according to an aspect of the present invention is illustrated. The materials handling vehicle 110 includes a power unit 114, a load handling apparatus 116 comprising a pair of forks 116A and 116B, each fork comprising a respective load wheel 118A, 118B, a pair of caster wheels 119 (only one shown), and a control handle 120. The vehicle 110 further comprises a generally vertically extending fixed backrest structure 121 coupled to the power unit 114 and a steered driven wheel (not shown) that is powered by the power unit 114 and steered by rotation of the control handle 120. The fixed backrest structure 121 may be conventionally secured to the power unit 114 and may comprise a preexisting backrest.

The backrest assembly 112 comprises a generally vertically extending adjustable backrest structure 122 and mounting structure 126. The adjustable backrest structure 122 and the fixed backrest structure 121 are each located over the load handling apparatus 116, with the fixed backrest structure 121 being located closer to the power unit 114 than the adjustable backrest structure 122.

The mounting structure 126 is coupled to the adjustable backrest structure 122 and to the vehicle 10, i.e., to the fixed backrest structure 121 in the embodiment shown. The mounting structure 126 allows the adjustable backrest structure 122 to be positioned in a first position generally adjacent to the power unit 114, illustrated in FIG. 2, wherein pallets of a first size are accommodated, and a second position spaced along the load handling apparatus 116 from the power unit 114, illustrated in FIG. 3, wherein pallets of a second size are accommodated. According to one aspect of the present invention, the adjustable backrest structure 122 may accommodate pallets having a length of about 48 inches while in the first position and may accommodate pallets having a length of about 36 inches while in the second position, although the first and second positions may be configured so as to accommodate pallets of other lengths. It is understood that the effective length of the load handling apparatus 116, i.e., the portion of the forks 116A and 116B between the adjustable backrest structure 122 and the tips of the forks 116A and 116B, may vary depending on the particular vehicle for providing support for pallets having a particular length. It is also noted that the mounting structure 126 could be coupled to other components of the vehicle 10, such as the power unit 114, rather than to the fixed backrest assembly 121 if desired.

According to this aspect of the present invention, the mounting structure 126 comprises a plurality of hinge members 127, wherein each hinge member 127 is pivotably coupled to the adjustable backrest structure 122 and to the fixed backrest structure 121 to enable pivoting movement of the adjustable backrest structure 122 with respect to the fixed backrest structure 121. According to one aspect of the present invention, the mounting structure 126 may comprise a four bar linkage. As is evident from FIGS. 2 and 3, the adjustable backrest structure 122 is located vertically higher in the first position (illustrated in FIG. 2) than when in the second position (illustrated in FIG. 3).

Figure 5A:
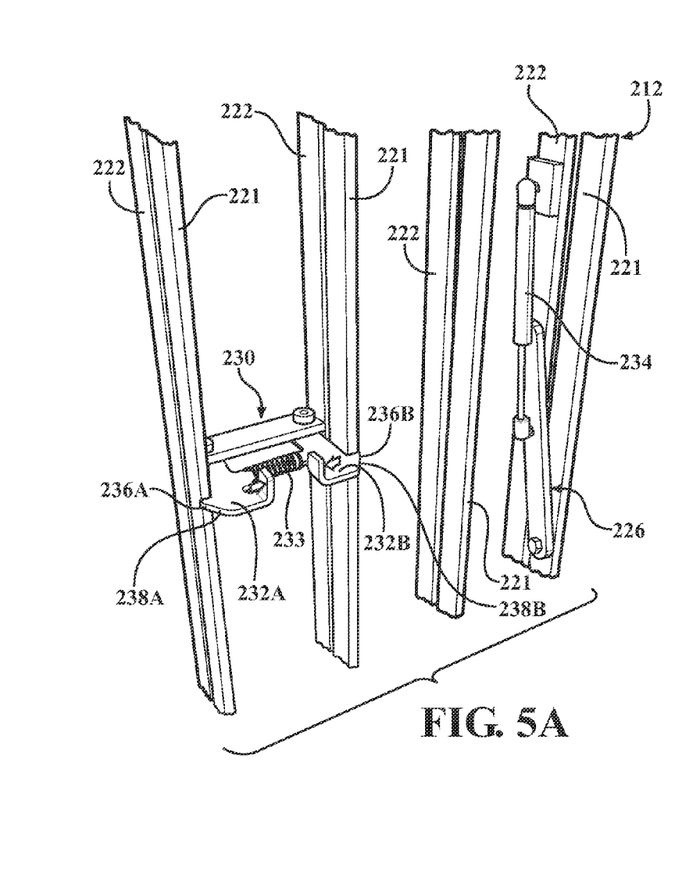
FIGS. 5A and 5B are enlarged perspective views of a locking mechanism of an adjustable backrest assembly for a materials handling vehicle according to another aspect of the present invention.
Figure 5B:
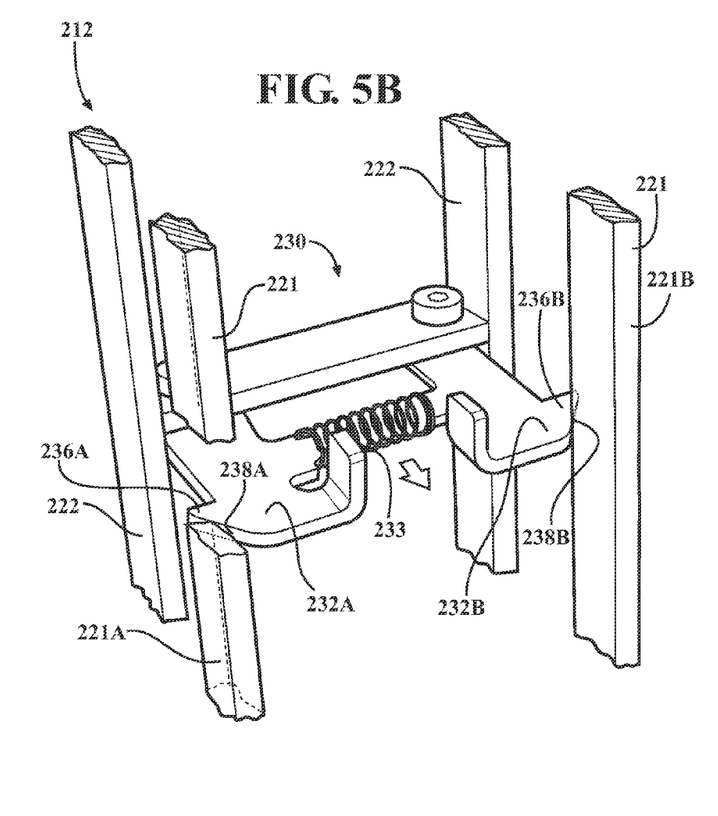

The load backrest assembly 122 further includes a locking mechanism 128 that permits the adjustable backrest structure 122 to be locked in at least the first position. The locking mechanism 128 may comprise one or more latching members 130, as illustrated in FIGS. 2 and 3, or may comprise other suitable locking mechanisms, one of which is illustrated in FIGS. 5A-5B and will be discussed below. The latching members 130 according to this aspect of the present invention are attached to the fixed backrest structure 121 and engage associated pins 132 affixed to the adjustable backrest structure 122 for securing the adjustable backrest structure 122 in the first position. It is noted that the latching members 130 could be attached to the adjustable backrest structure 122 and the pins 132 could be affixed to the fixed backrest structure 121. Further, while two sets of latching members 130 and pins 132 are associated with the backrest assembly 112 illustrated in FIGS. 2 and 3, additional or fewer sets could be provided.

The backrest assembly 112 also comprises a plate 133 that extends downwardly from the adjustable backrest structure 122. The plate 133 is sized such that is comes in close proximity to the respective forks 16A, 16B when the adjustable backrest structure 122 is in the second position. The plate 133 functions to prevent substantial lateral movement of the adjustable backrest structure 122, i.e., in the case of an object striking either of the lateral sides of the adjustable backrest structure 122.

Movement of the adjustable backrest structure 122 from the first position to the second position is accomplished by an operator unlatching the latching members 130 from the associated pins 132, which allows pivoting movement of the adjustable backrest structure 122 with respect to the fixed backrest structure 121, i.e., via the mounting structure 126, which, in the illustrated embodiment, comprises a four bar linkage. The operator then moves the adjustable backrest structure 122 to the second position by pivoting/rotating the adjustable backrest structure 122 down and away from the fixed backrest structure 121. The adjustable backrest structure 122 may be secured in the second position by gravitational forces exerted on the adjustable backrest structure 122, which, absent other forces pushing the adjustable backrest structure 122 upward, prevent the adjustable backrest structure 122 from rotating up and toward the fixed backrest structure 121. Alternatively, the adjustable backrest structure 122 may be maintained in the second position by a second locking mechanism (not shown) or a modified version of the locking mechanism 128.

Movement of the adjustable backrest structure 122 from the second position to the first position is accomplished by an operator pivoting/rotating the adjustable backrest structure 122 up and toward the fixed backrest structure 121. The operator may then use the locking mechanism 128 to lock the adjustable backrest structure 122 in the first position by securing the latching members 130 to the associated pins 132.

It is contemplated that the locking mechanism 128 could permit the adjustable backrest structure 122 to be positioned in at least one position between the first and second positions. For example, the adjustable backrest structure 122 could comprise additional pins (not shown), wherein each pin could be positioned to selectively engage a corresponding latching member 130 so as to support the adjustable backrest structure 122 in a position between the first and second positions. Alternatively, the latching members 130 could include additional pin engaging slots, wherein each slot could selectively engage a respective pin 132 to support the adjustable backrest structure 122 in a corresponding position between the first and second positions.

Figure 4:
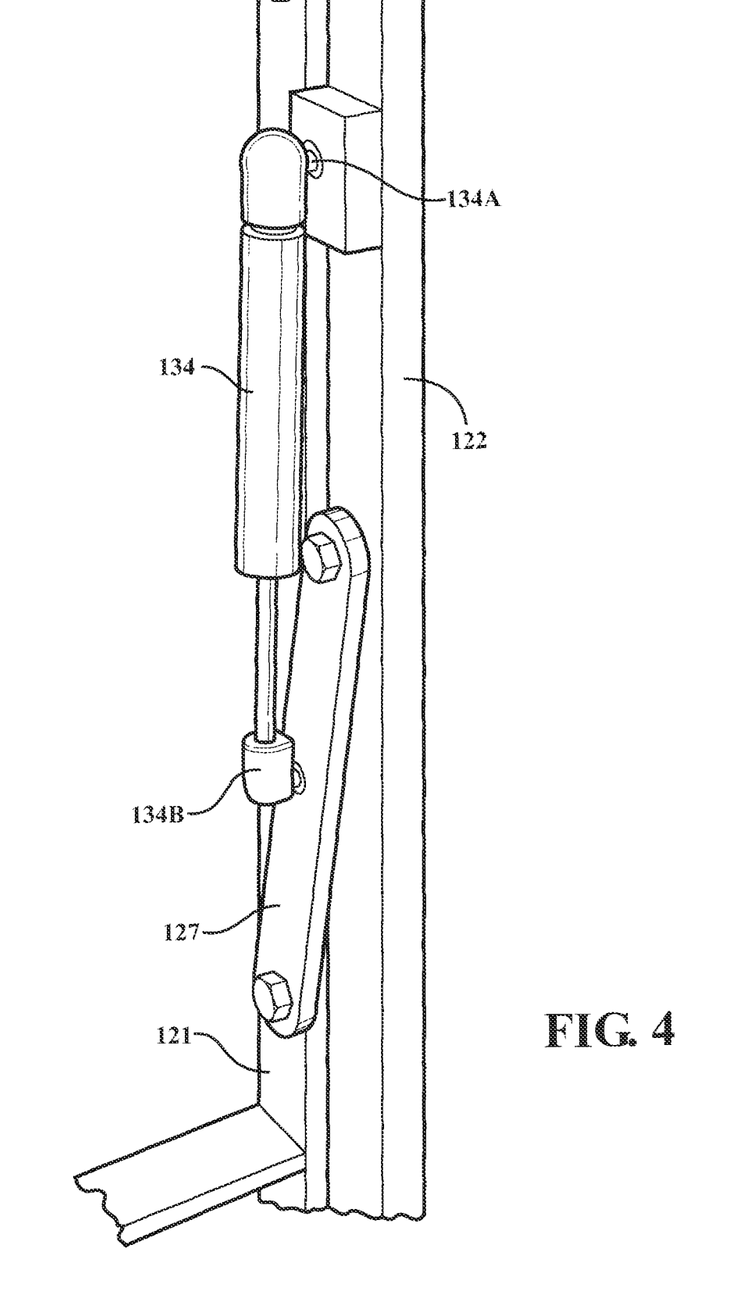
FIG. 4 is an enlarged perspective view of a movement assistance device associated with the backrest assembly illustrated in FIGS. 2 and 3.

As most clearly shown in FIG. 4, the load backrest assembly 112 may further comprise one or more movement assist devices 134 coupled between the adjustable backrest structure 122 and the hinge members 127 for assisting the operator in moving the adjustable backrest structure 122 back and forth between the first and second positions. In the embodiment shown, two movement assist devices 134 are provided, one on each lateral side of the adjustable backrest structure 122. Each device 134 may comprise, for example, a gas spring coupled at a first end 134A thereof to the adjustable backrest structure 122, and coupled at a second end 134B thereof to a corresponding one of the hinge members 127. It is noted that the second end 134B of the device 134 may be coupled to other structure, such as, for example, the fixed backrest structure 121 or the power unit 114. Upon an operator initiating movement of the adjustable backrest structure 122 between the first and second positions, the device 134 provides a force to the adjustable backrest structure 122 to assist in moving the adjustable backrest structure 122 between the first and second positions.

The adjustable backrest assembly 112 enables quick and efficient transitions between positions to maximize operator work productivity. Moreover, the adjustable backrest structure 122 can be moved between positions by an operator with the use of only one hand. Additionally, with the use of the movement assist device 134, little effort is required by the operator to move the adjustable backrest structure 122 between positions. Further, since the adjustable backrest structure 122 pivots between positions and does not slide between positions, the adjustable backrest structure 122 is less prone to getting stuck between positions than sliding adjustable backrest structures.

The adjustable backrest assembly 112 described herein can be affixed to existing materials handling vehicles, i.e., which comprise only a fixed backrest structure 121, or the adjustable backrest assembly 112 could be implemented in new materials handling vehicles.

Referring now to FIGS. 5A and 5B, an adjustable backrest assembly 212 according to another aspect of the present invention is illustrated. According to this aspect of the present invention, the backrest assembly 212 comprises a generally vertically extending adjustable backrest structure 222 and mounting structure 226 (see FIG. 5A), as described above with reference to FIGS. 2 and 3.

The mounting structure 226 is coupled to the adjustable backrest structure 222 and to a conventional fixed backrest structure 221 and allows the adjustable backrest structure 222 to be positioned in first and second positions similar to those described above with reference to FIGS. 2 and 3.

A locking mechanism 230 according to this aspect of the present invention is associated with the adjustable backrest structure 222 and the fixed backrest structure 221 and is employed to lock the adjustable backrest structure 222 in the first position, which is illustrated in FIG. 5A. The locking mechanism 230 according to this aspect of the present invention comprises first and second latching members 232A, 232B coupled to the adjustable backrest structure 222 and a spring member 233 coupled to and extending between the latching members 232A, 232B.

The latching members 232A, 232B each comprise hooked ends 236A, 236B, which hooked ends 236A, 236B are adapted to engage vertically extending bars 221A, 221B (see FIG. 5B) of the fixed backrest structure 221 to lock the adjustable backrest structure 222 in the first position, as illustrated in FIG. 5A. The hooked ends 236A, 236B also comprise angled portions 238A, 238B, which angled portions 238A, 238B are adapted to slide along the respective vertically extending bars 221A, 221B of the fixed backrest structure 221 when an operator is moving the adjustable backrest structure 222 into the first position, as will be described below.

The spring member 233 provides a separational force against the latching members 232A, 232B such that the latching members 232A, 232B can be maintained in a locked position that maintains the adjustable backrest structure 222 in the first position. To unlock the locking mechanism 230 so as to enable movement of the adjustable backrest structure 222 into the second position, the operator applies a counter force in the opposite direction to the separational force by squeezing the latching members 232A, 232B toward each other, as indicated by the arrows in FIG. 5A. The counter force, upon overcoming the separational force exerted on the latching members 232A, 232B by the spring member 233, causes the latching members 232A, 232B to move toward each other. Once the hooked ends 236A, 236B of the latching members 232A, 232B clear the respective vertically extending bars 221A, 221B of the fixed backrest structure 221, the adjustable backrest structure 222 can be pivoted into the second position, as described above with reference to FIGS. 2 and 3.

To move the adjustable backrest structure 222 back into the locked, first position, the operator pivots/rotates the adjustable backrest structure 222 up and toward the fixed backrest structure 221 as described above with reference to FIGS. 2 and 3. Referring to FIG. 5B, upon the angled portions 238A, 238B of the latching members 232A, 232B contacting the bars 221A, 221B of the fixed backrest structure 221, continued movement of the adjustable backrest structure 222 toward the fixed backrest structure 221 in the direction of the arrow in FIG. 5B applies a counter force against the separational force of the spring member 233, causing the latching members 232A, 232B to move towards one another. The angled portions 238A, 238B of the latching members 232A, 232B slide against the bars 221A, 221B of the fixed backrest structure 221 until the hooked ends 236A, 236B of the latching members 232A, 232B clear the bars 221A, 221B, at which point the latching members 232A, 232B are caused to move away from each other due to the separational force exerted by the spring member 233 to lock the adjustable backrest structure 222 in the first position.

It is noted that the backrest assembly 212 may further comprise one or more movement assistance devices 234, as described above with reference to FIG. 4.

Figure 6:
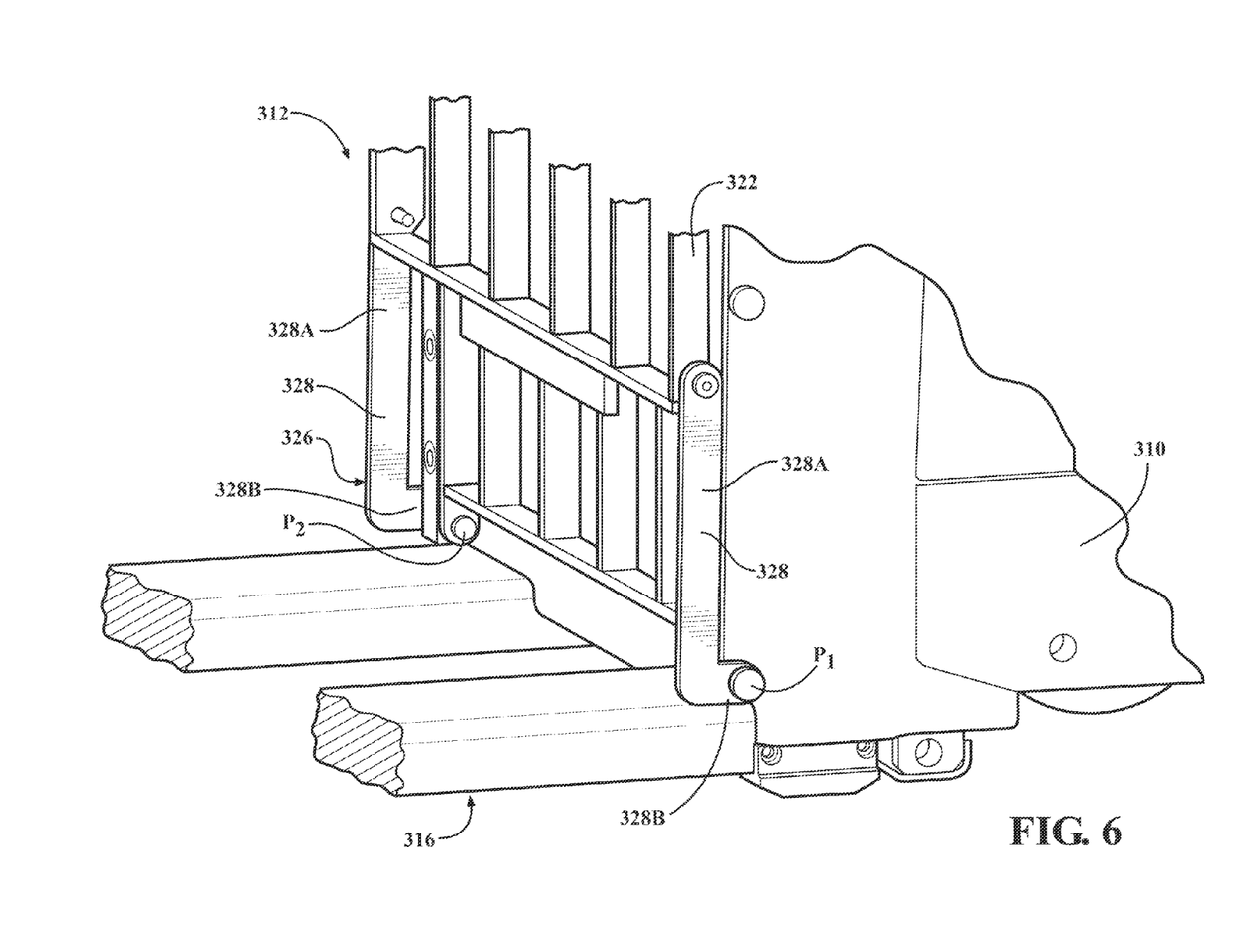
FIG. 6 is an enlarged perspective view of a lower hinge member of an adjustable backrest assembly for a materials handling vehicle according to yet another aspect of the present invention.

Referring now to FIG. 6, lower hinge members 328 of a mounting structure 326 of an adjustable backrest assembly 312 according to another aspect of the present invention are pivotably coupled to an adjustable backrest structure 322 and to a materials handling vehicle 310. The lower hinge members 328 of this embodiment may define L-shaped structures, such that first portions 328A of the lower hinge members 328 extend substantially vertically downward from the adjustable backrest structure 322 when the adjustable backrest structure 322 is positioned in a first position. Hence, these first portions 328A of the lower hinge members 328 may create a substantially vertical "stop structure" for pallets of a first size accommodated by a load handling apparatus 316 when the adjustable backrest structure 322 is positioned in the first position, while not interfering with pallets of a second size accommodated by the load handling apparatus 316 when the adjustable backrest structure 322 is positioned in a second position (not shown in this embodiment). Further, while the adjustable backrest structure 322 is positioned in the first position, second portions 328B of the lower hinge members 328, which are considerably shorter than the first portions 328A of the lower hinge members 328 as shown in FIG. 6, extend generally horizontally from the first portions 328A. As shown in FIG. 6, pivot points $P_1$, $P_2$ are located at respective intersections of the second portions 328B of the lower hinge members 328 and the materials handling vehicle 310 to allow pivoting movement of the adjustable backrest structure 322 between its first and second positions.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A backrest assembly for a materials handling vehicle comprising:
   an adjustable backrest structure;
   mounting structure for mounting said adjustable backrest structure on the materials handling vehicle so that said adjustable backrest structure extends generally vertically over load handling apparatus of the materials handling vehicle, said mounting structure enabling pivoting movement of said adjustable backrest structure from a first position generally adjacent a power unit of the materials handling vehicle wherein pallets of a first size are accommodated to at least a second position spaced along the load handling apparatus from the power unit wherein pallets of a second size are accommodated; and
   a locking mechanism for securing said adjustable backrest structure in at least said first position, said locking mechanism comprising:
      a pair of latching members coupled to one of said vehicle and said adjustable backrest structure, said latching members adapted to engage the other of said vehicle and said adjustable backrest structure for securing said adjustable backrest structure in at least said first position; and
      a spring member disposed between said latching members, said spring member providing a separational force against said latching members to maintain said latching members in a locked position so as to secure said adjustable backrest structure in at least said first position.

2. The backrest assembly for a materials handling vehicle as claimed in claim 1 wherein said locking mechanism secures said adjustable backrest structure in at least one position between said first position and said at least second position.

3. The backrest assembly for a materials handling vehicle as claimed in claim 1 wherein said mounting structure comprises a plurality of hinge members.

4. The backrest assembly for a materials handling vehicle as claimed in claim 3 wherein lower ones of said hinge members define an L-shaped structure, wherein portions of said lower hinge members extend substantially vertically downward from said adjustable backrest structure when said adjustable backrest structure is positioned in said first position so as to create a stop structure for pallets accommodated by said load handling apparatus.

5. The backrest assembly for a materials handling vehicle as claimed in claim 1 wherein said adjustable backrest structure is mounted adjacent to a fixed backrest structure of the materials handling vehicle.

6. The backrest assembly for a materials handling vehicle as claimed in claim 1 further comprising a device coupled between said adjustable backrest structure and the materials handling vehicle for assisting an operator in moving said adjustable backrest structure back and forth between said first position and said at least second position.

7. The backrest assembly for a materials handling vehicle as claimed in claim 6 wherein said device comprises a gas spring.

8. The backrest assembly for a materials handling vehicle as claimed in claim 1 wherein said adjustable backrest structure is located vertically higher in said first position than when in said at least second position.

9. The backrest assembly for a materials handling vehicle as claimed in claim 1 wherein said mounting structure comprises a four bar linkage.

10. The backrest assembly for a materials handling vehicle as claimed in claim 1 wherein ends of said latching members comprise angled portions that slide along respective vertically extending bars of a fixed backrest structure of the vehicle when an operator is moving said adjustable backrest structure into said first position.

11. The backrest assembly for a materials handling vehicle as claimed in claim 10 wherein said ends of said latching members comprise hooked ends that engage the respective vertically extending bars of the fixed backrest structure upon said adjustable backrest structure being moved into said first position to lock said adjustable backrest structure in said first position.

12. A materials handling vehicle comprising:
   a power unit;
   a load handling apparatus; and
   a backrest assembly comprising:
      an adjustable backrest structure;
      mounting structure for mounting said adjustable backrest structure to the materials handling vehicle so that said adjustable backrest structure extends generally vertically over said load handling apparatus of the materials handling vehicle, said mounting structure enabling pivoting movement of said adjustable backrest structure from a first position generally adjacent said power unit wherein pallets of a first size are accommodated to at least a second position spaced along said load handling apparatus from said power unit wherein pallets of a second size are accommodated; and
      a locking mechanism for securing said adjustable backrest structure in at least said first position, said locking mechanism comprising a pair of latching members coupled to said adjustable backrest structure and a spring member disposed between said latching members, said spring member providing a separational force against said latching members to maintain said latching members in a locked position so as to secure said adjustable backrest structure in at least said first position.

13. The materials handling vehicle as claimed in claim 12 wherein said mounting structure comprises a four bar linkage.

14. The materials handling vehicle as claimed in claim 12 wherein said adjustable backrest structure is mounted adjacent to a fixed backrest structure of the materials handling vehicle.

15. The materials handling vehicle as claimed in claim 12 further comprising a device coupled between said adjustable backrest structure and the materials handling vehicle for assisting an operator in moving said adjustable backrest structure back and forth between said first position and said at least second position.

16. The materials handling vehicle as claimed in claim 15 wherein said device comprises a gas spring.

17. The materials handling vehicle as claimed in claim 12 wherein said adjustable backrest structure is located vertically higher in said first position than when in said at least second position.

18. A backrest assembly for a materials handling vehicle comprising:
an adjustable backrest structure; and
mounting structure comprising a plurality of hinge members pivotably coupled to said adjustable backrest structure and to the materials handling vehicle for mounting said adjustable backrest structure on the materials handling vehicle so that said adjustable backrest structure extends generally vertically over load handling apparatus of the materials handling vehicle, said mounting structure enabling pivoting movement of said adjustable backrest structure from a first position generally adjacent a power unit of the materials handling vehicle wherein pallets of a first size are accommodated to at least a second position spaced along the load handling apparatus from the power unit wherein pallets of a second size are accommodated.

19. The backrest assembly for a materials handling vehicle as claimed in claim 18, wherein lower ones of said hinge members comprise first and second portions that define an L-shape, said first portions of said lower hinge members extending substantially vertically downward from said adjustable backrest structure when said adjustable backrest structure is positioned in said first position so as to create stop structure for pallets of said first size.

20. The backrest assembly for a materials handling vehicle as claimed in claim 19 wherein said second portions of said lower hinge members extend generally horizontally from said first portions of said lower hinge members when said adjustable backrest structure is positioned in said first position.

21. The backrest assembly for a materials handling vehicle as claimed in claim 20 wherein said second portions of said lower hinge members are pivotably coupled to the materials handling vehicle to allow pivoting movement of said adjustable backrest structure between said first and second positions.

22. The backrest assembly for a materials handling vehicle as claimed in claim 20 wherein said second portions of said lower hinge members are shorter than said first portions of said lower hinge members.

\* \* \* \* \*